United States Patent
Rashkovskiy

(10) Patent No.: US 6,616,533 B1
(45) Date of Patent: Sep. 9, 2003

(54) PROVIDING ADVERTISING WITH VIDEO GAMES

(75) Inventor: Oleg B. Rashkovskiy, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/584,507

(22) Filed: May 31, 2000

(51) Int. Cl.⁷ .................................................. A63F 9/24
(52) U.S. Cl. .............................. 463/31; 705/14; 705/26; 463/43
(58) Field of Search .................................. 463/1, 29, 30, 463/36, 40–42; 455/3.1, 5.1, 6.3; 705/1, 14, 16–17, 26–27; 348/1–2, 6, 10, 12–13; 345/700, 716, 717, 719; 707/500.1, 501.1

(56) References Cited

U.S. PATENT DOCUMENTS

| | | | |
|---|---|---|---|
| 4,745,468 A | 5/1988 | Von Kohorn | 358/84 |
| 4,876,592 A | 10/1989 | Von Kohorn | 358/84 |
| 4,926,255 A | 5/1990 | Von Kohorn | 358/84 |
| 5,034,807 A | 7/1991 | Von Kohorn | 358/84 |
| 5,057,915 A | 10/1991 | Von Kohorn | 358/84 |
| 5,283,734 A | 2/1994 | Von Kohorn | 364/412 |
| 5,508,731 A | 4/1996 | Kohorn | 348/1 |
| 5,551,692 A | 9/1996 | Pettit et al. | 273/143 R |
| 5,668,950 A * | 9/1997 | Kikuchi et al. | 463/42 |
| 5,697,844 A | 12/1997 | Von Kohorn | 463/40 |
| 5,708,845 A | 1/1998 | Wistendahl et al. | 395/806 |
| 5,759,101 A | 6/1998 | Von Kohorn | 463/40 |
| 5,816,918 A * | 10/1998 | Kelly et al. | 463/16 |
| 5,823,879 A * | 10/1998 | Goldberg et al. | 463/42 |
| 5,890,963 A | 4/1999 | Yen | 463/42 |
| 5,916,024 A | 6/1999 | Von Kohorn | 463/40 |
| 6,015,344 A | 1/2000 | Kelly et al. | 463/16 |
| 6,036,601 A | 3/2000 | Heckel | 463/42 |
| 6,186,893 B1 * | 2/2001 | Walker et al. | 705/16 |
| 6,196,920 B1 | 3/2001 | Spaur et al. | 463/42 |

FOREIGN PATENT DOCUMENTS

| | | | | |
|---|---|---|---|---|
| EP | 07027862 | | 8/1996 | G09G/5/00 |
| EP | 0752678 A2 | | 8/1997 | G06F/19/00 |
| GB | 2141907 | * | 1/1985 | |
| WO | PCT/GB93/00905 | | 11/1993 | A63F/9/22 |

OTHER PUBLICATIONS

Gillen, Marilyn A., 'Ads Begin To Pop Up in CD–ROMs, Games: Ads begin in video & games and CD–Rom', Billboard, Mar. 25, 1995, pp. 58.*
translation of JP 08–221045 from JPO website.*

* cited by examiner

Primary Examiner—Mark Sager
(74) Attorney, Agent, or Firm—Trop, Pruner & Hu, P.C.

(57) ABSTRACT

A video game may be associated with advertising such that when the player mouse clicks on an image element in the course of play of the game, the game play may automatically be paused in one embodiment. Once the game play is paused, an advertising graphical user interface may be displayed that enables the user to purchase items associated with image elements observed in the course of game play.

26 Claims, 9 Drawing Sheets

PROVIDING ADVERTISING WITH VIDEO GAMES

BACKGROUND

This invention relates generally to video games which may be played in video arcades or using home computer systems.

Video games involve a series of video images each including a plurality of image elements. The video games generally require the user to navigate through a series of video images that may operate like a video movie. Commonly, these video images are animated. The user is called upon to take certain action in the course of traversing the video images and may receive score or credit based on his or her performance.

With the high speeds available with current computer systems, video games both in arcades and in homes have become extremely popular. Because of the higher speeds now possible, the video game action is more lifelike. Therefore, exciting game sequences are available that require considerable skill to successfully play such high speed games.

Many games now have multi-player formats that may be played over the Internet by unrelated players. The players compete with each other by playing the game from separate computer systems linked over the Internet.

A number of games such as Quake® (Id Software, Inc.) have received considerable attention. Organizations of devotees of the various games have been started. Many players have considerable interest in purchasing items associated with the games. Thus, many of the game makers or their licensees also sell related items to users. These items may be sold through web sites offered by the game makers or their licensees. The types of items sold include action figures and clothing related to the games.

Given the extensive consumer acceptance and widespread interest in such games, there is always a need for better ways to commercialize the economic value generated from these games.

DETAILED DESCRIPTION

Figure 1:
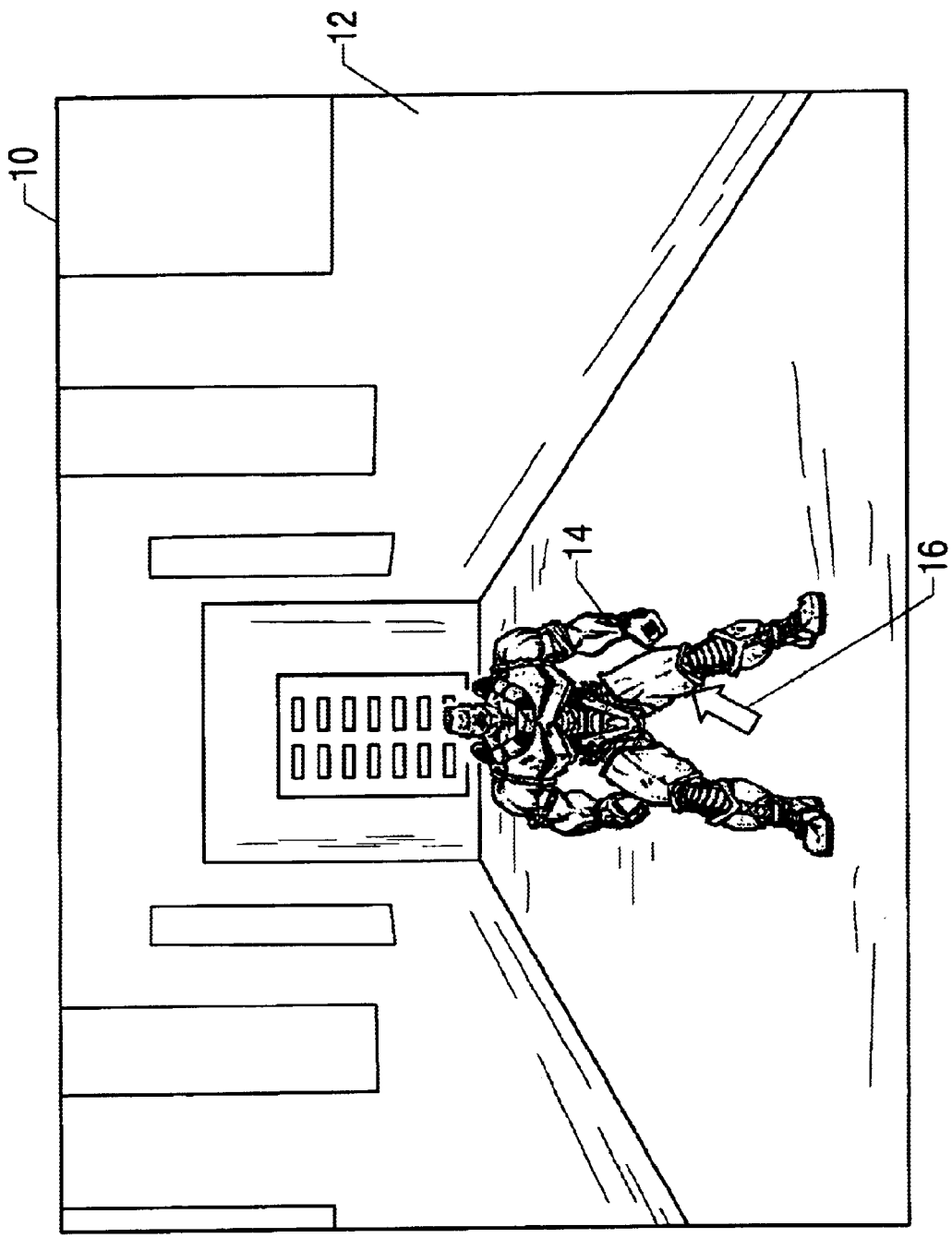
FIG. 1 is a graphical user interface from a hypothetical video game.

A video game may include a plurality of images or graphical user interfaces 10, shown in FIG. 1, that create a video sequence such as an animated video sequence. Each video sequence includes a number of frames or graphical user interfaces 10. The hypothetical graphical user interface 10 includes a background image element 12 and an action character image element 14. For example, the action character image element 14 may be an enemy and the video game may revolve around the user's firing some type of virtual weapon to destroy the action character.

In the course of the video game, the user may utilize a mouse cursor 16 to select a variety of hot clickable image elements such as the image element 14 in a graphical user interface 10 that is part of a sequence of video images. "Hot clickable" refers to the incorporation of anchors into the code of an image element such that when the user selects the image element the user is linked or hyperlinked to other information. In one embodiment of the invention, the image element 14 may be coded so that user selection of the image element 14 may automatically pause the play of the game. The selection may occur by mouse clicking when the cursor 16 is over the item of interest such as the element 14.

Figure 2:
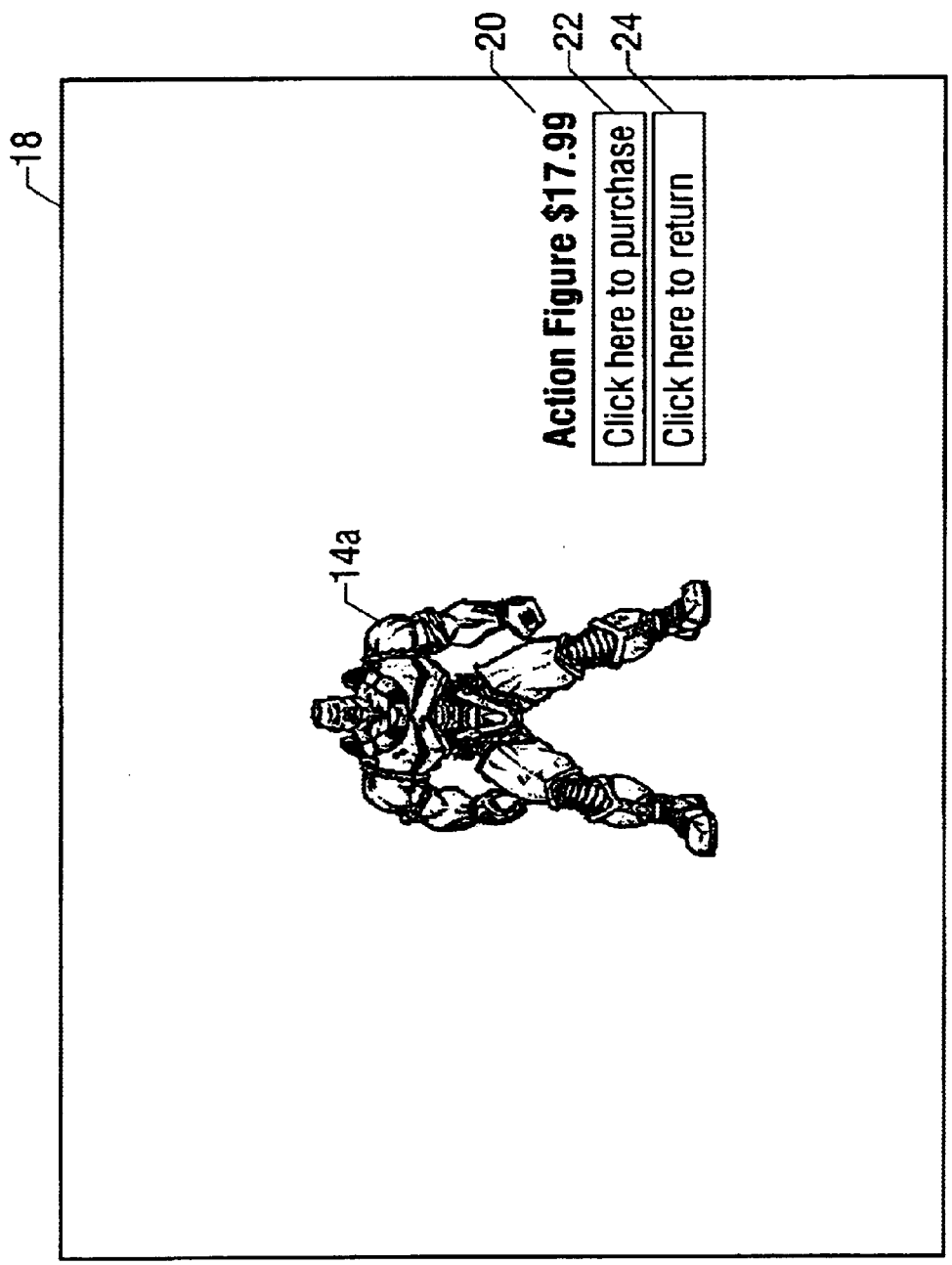
FIG. 2 is a graphical user interface including an image element from the graphical user interface shown in FIG. 1 in accordance with one embodiment of the present invention.

Once the game play is paused, an advertising graphical user interface 18, shown in FIG. 2, may be displayed that may depict a product such as a doll or action figure image 14a corresponding to the image element 14 from the graphical user interface 10. The image 14a, in the advertising graphical user interface 18, is displayed together with advertising information 20. In addition, a graphical user interface icon 22 may be provided to enable the user to simply mouse click on the icon 22 to purchase the imaged item, for example using a shopping cart software system. Also included in the graphical user interface 18 is an icon 24 to enable the user to unpause the game and return to the video game where the game was previously paused (i.e. at the interface 10).

As used herein advertising including a notice or message related to the sale or other transfer of a product or service. It may be purely informational or it may provide the capability to make a purchase or other acquisition.

In some cases, the advertising graphical user interface 18 may be incorporated within the electronic recordable media that the consumer purchases to play the video game. Such recordable media include floppy disks, compact disks, digital video disks and memory sticks, as examples. Thus, the recordable media may include a plurality of advertising graphical user interfaces 18 each associated with hot clickable image elements included within the game. In such case, if the user elects to purchase an imaged item, a connection through the Internet to a web server may be automatically initiated to complete the transaction.

In other cases, the video game may be played over the Internet. The advertising graphical user interface 18 may thereby be provided over the Internet as well. In such case, more graphical user interfaces 18 may be made available for more hot clickable image elements 14 as the video game matures. Since the connection is already available to the web server, the sales transaction may be automatically completed, all over the same Internet connection.

As still another alternative, when a user clicks on an image element 14, the graphical user interface 18 may be downloaded over the Internet from a web site whose uniform resource locator (URL) is used to automatically obtain the information to build the interface 18. In such case, if the user elects to purchase an item, an Internet connection is already available and the transaction may be quickly completed.

Figure 3:
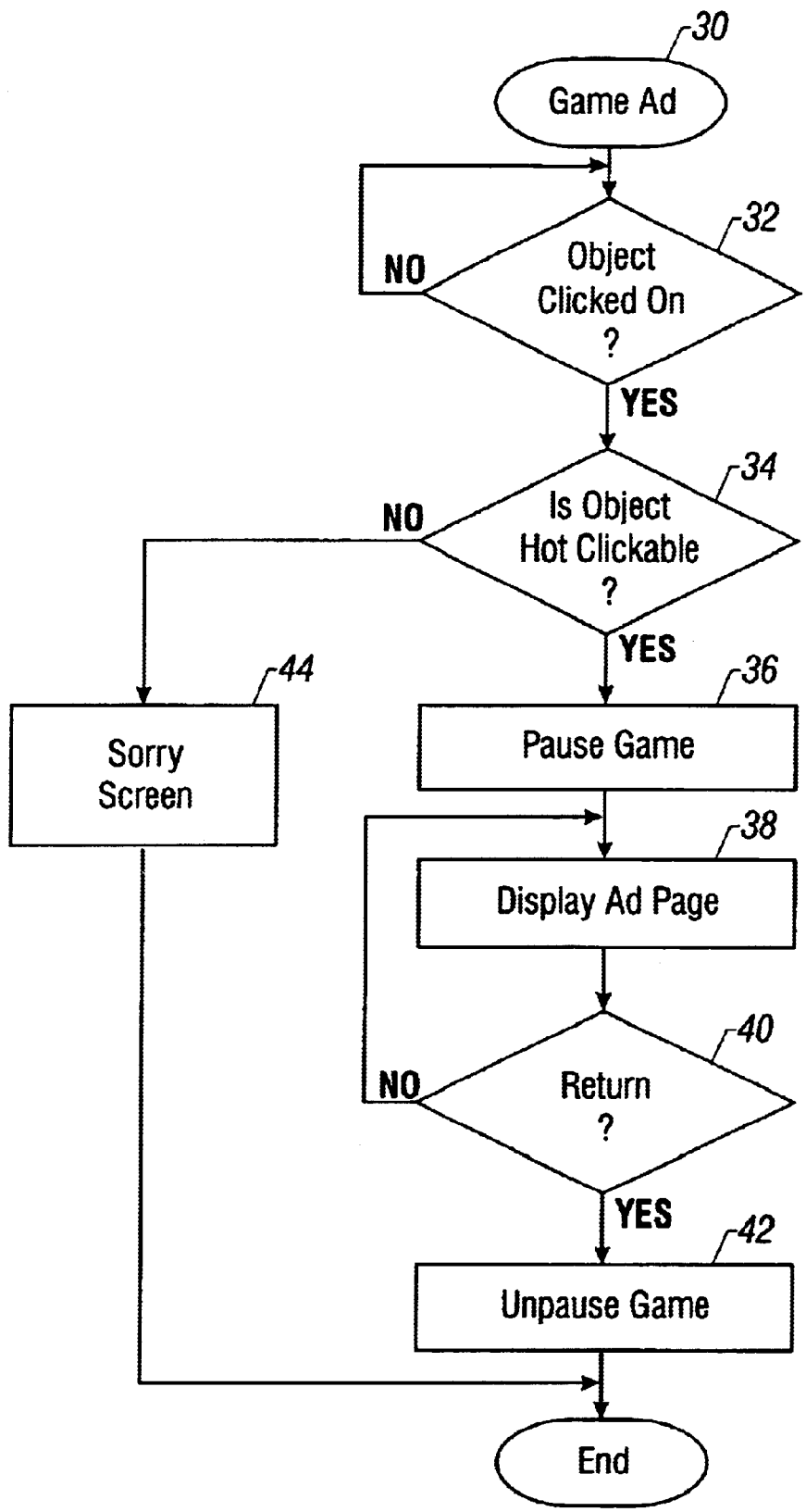
FIG. 3 is a flow chart for software in accordance with one embodiment of the present invention.

The software 30 for incorporating the game advertising into the play of a video game, in accordance with on embodiment, begins by determining whether the user has mouse clicked on an image element in a graphical user interface 10, as indicated in diamond 32 in FIG. 3. If the selected image element is hot clickable, as determined at diamond 34, the game is automatically paused as indicated in block 36.

Once the game has been paused, advertising may be displayed such as the graphical user interface 18, as indicated in block 38. If the user elects to make a purchase, additional connections, such as Internet connections, may be established to complete the transaction. If instead, the user elects to return to the game play at diamond 40, for example by selecting the icon 24, the game is automatically resumed as indicated in block 42. If the user selects an item which is not hot clickable, a "sorry" screen may displayed as indicated in block 44, indicating that no transaction is available through the particular selected item.

Figure 9:
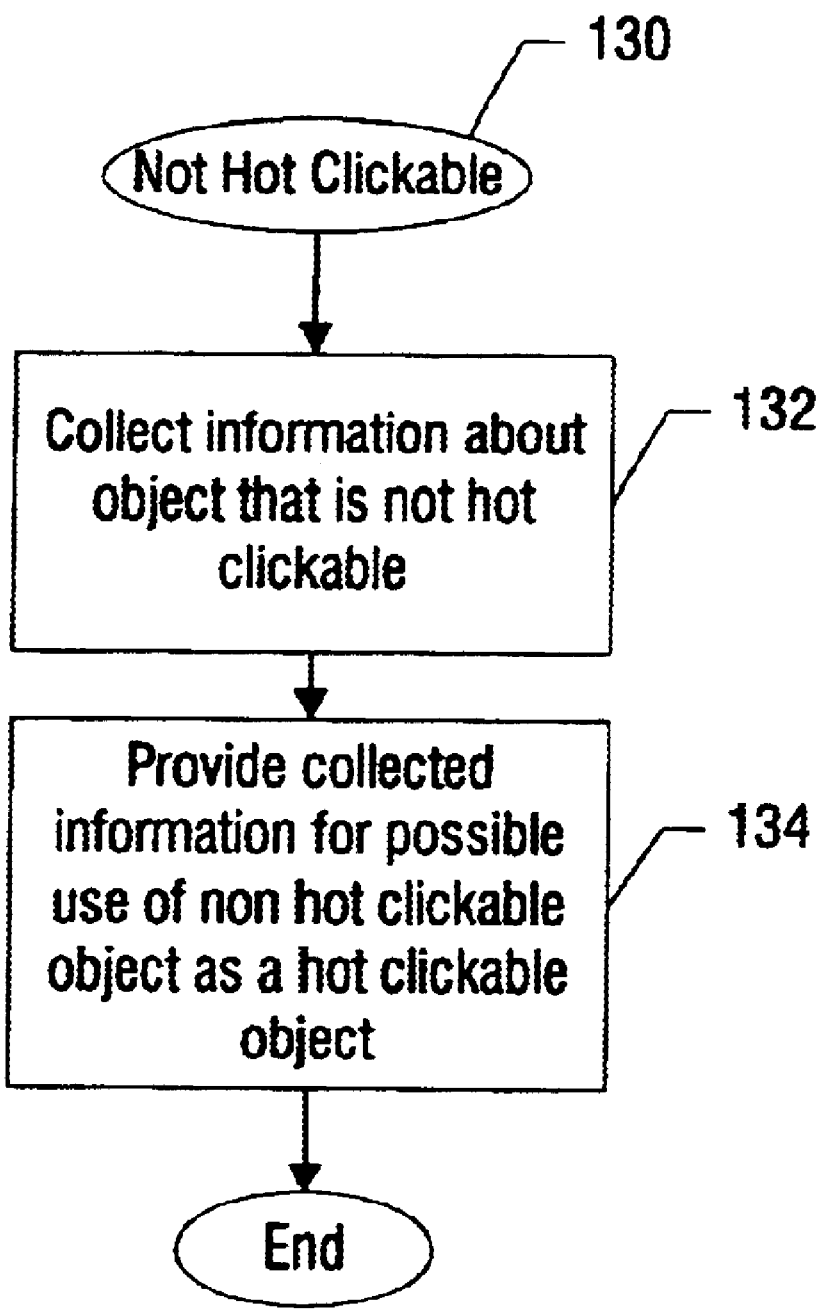
FIG. 9 is a flow chart for software for use with other software in accordance with some embodiments of the present invention.

As shown in FIG. 9, in some embodiments of the present invention, information about image elements that are not hot clickable (130) that have been mouse click selected may be collected, as shown in block 132 and provided to a web server at periodic intervals, as shown in block 134. This information may be used by the owner of the web server to develop additional products sold through additional hot clickable elements. These additional hot clickable elements may be incorporated into future recordable media containing the game, which is also shown in block 134. In games played on hardware connected to the Internet, the games may be modified so as to provide advertising for the frequently selected image elements (block 134). In this case, the owner may respond to user requests that the owner may not have anticipated. In such case, the owner may supply additional goods and services through image elements that are converted into hot clickable image elements in response to consumer demand.

In some embodiments of the present invention, a connection to a network such as the Internet may be utilized to update the advertising. Additional advertising may be provided for additional hot clickable elements. Moreover, the advertising subject matter may be modified. Particularly, in connection with advertising associated with background material, the sponsoring advertising may be modified by downloading new software periodically. Thus, in one embodiment of the present invention, a sponsor may sponsor a background image in the course of the game and after a period of time may no longer continue that sponsorship. A new sponsor may assume the position previously occupied by the previous sponsor. At such time, new software may be downloaded to change the background material.

While the present invention is illustrated in connection with an embodiment in which hot clickable buttons such as the buttons 22 are provided, in other cases, the advertising may be implemented more conventionally. For example, a telephone number may be provided that enables the user to call to purchase a particular product or to gain more information about the product or service.

Updated information may be provided in a push systems in which the information is pushed to the game system periodically. Alternatively, the system may implement a pull system wherein the user can request additional information periodically which may be downloaded.

Figure 4:
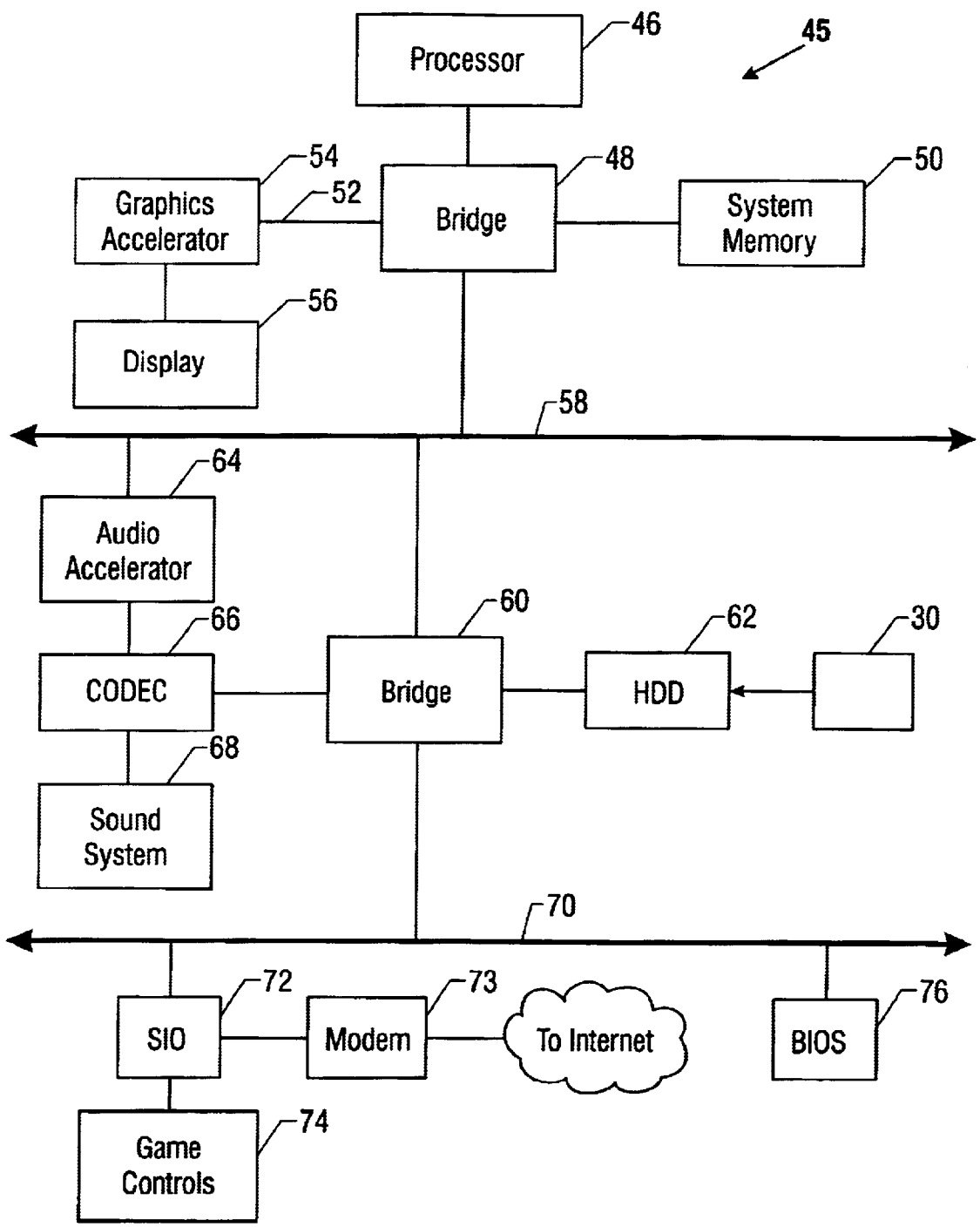
FIG. 4 is a block diagram for hardware in accordance with one embodiment of the present invention.

Referring to FIG. 4, a user may use a processor-based system 45 to play the video game. The system 45 may include a processor 46 coupled to a bridge 48. The bridge 48 may couple a system memory 50 to a graphics accelerator 54. The bridge 48 may be an accelerated graphics port bridge having an accelerated graphics port 52. The graphics accelerator 54 may be coupled to a display 56 that may be a television monitor in the case of some game consoles or it may be a computer monitor in the case of computer systems utilized to play video games.

The bridge 48 is coupled to a bus 58. The bus 58 is in turn coupled to another bridge and to an audio accelerator 64. The audio accelerator 64 is coupled to a coder/decoder (codec) 66 that is connected to a sound system 68. A hard disk drive 62 may be coupled to the bridge 60. The hard disk drive 62 may store information from electronic recordable media that cause the game to be displayed on the user's display 56. The hard disk drive 62 may also store the software 30 and the graphical user interfaces in accordance with one embodiment of the present invention.

The bridge 60 is in turn coupled to another bus 70 that is coupled to a serial input/output (SIO) device 72 and a basic input/output system (BIOS) memory 76. The SIO device 72 may be coupled to peripheral devices such as game controls 74. The SIO device 72 also connects to the Internet through a modem 73.

Of course, in other embodiments of the present invention, a conventional processor-based system may be utilized to play the video games over the Internet, and the software for implementing the game may be provided through a web server.

Figure 5:
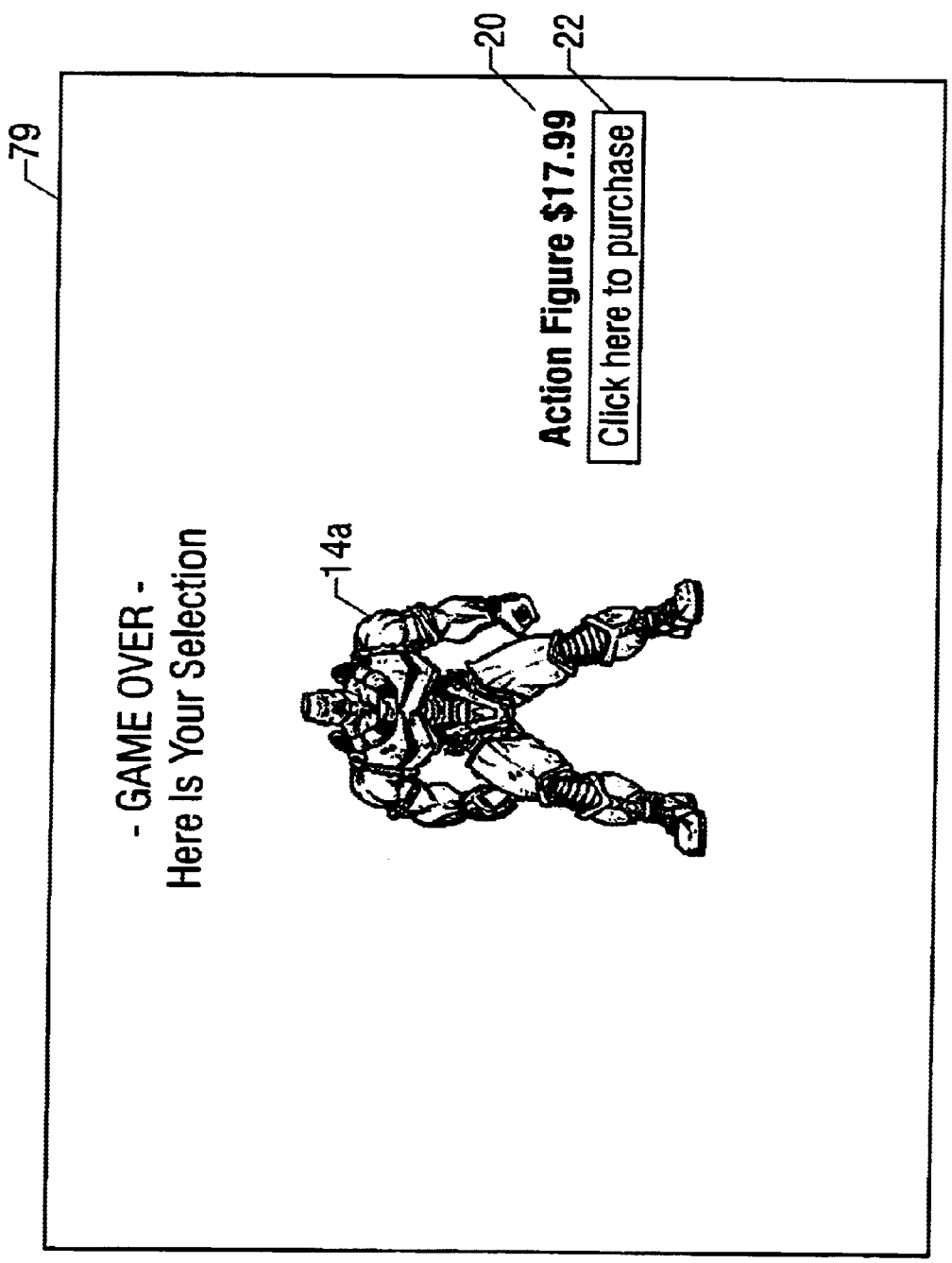
FIG. 5 is a graphical user interface in accordance with another embodiment of the present invention.

As another embodiment, in the course of a video game a user may indicate his or her desire to make a purchase. The purchase transaction may then be completed after the play of the game is completed. That is, the purchase information is automatically stored for later recall at the end of the game. Once the user completes the game, the purchase information interface 79 is automatically displayed on the user's display screen as indicated in FIG. 5. The user then undertakes the necessary input operation using icon 22 to actually purchase the desired item through a graphical user interface 79, for example, over the Internet. With this option, the game interruption may be reduced.

Figure 6:
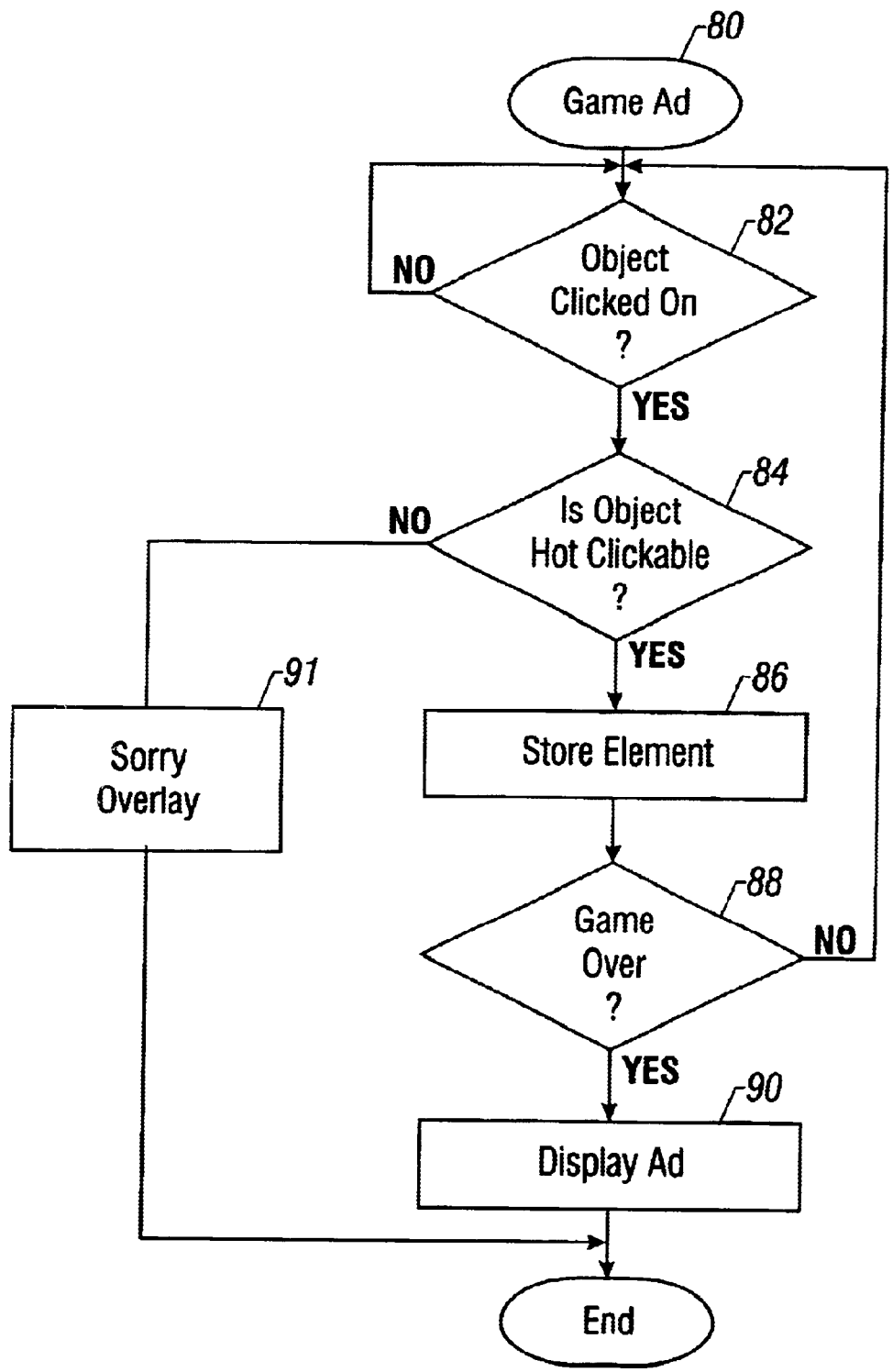
FIG. 6 is a flow chart for software in accordance with another embodiment of the present invention.

Game ad software 80 may be utilized to provide an advertising at the end of the game in response to a user selection in the course of playing the game, as shown in FIG. 6. Initially, a check at diamond 82 determines whether an object, such as an image element 14, has been clicked on during the course of play as indicated in diamond 82. If so, a check at diamond 84 determines whether the clicked upon object is hot clickable. If so, the element is stored as indicated in block 86. When the end of the game is detected (diamond 88), the ad is displayed as indicated in block 90. Until the game is over, the element 14 is stored. If the object clicked upon is not hot clickable, instead of providing a sorry display screen, a sorry overlay may be provided on the ongoing game display as indicated in block 91.

In some embodiments, the advertising graphical user interface 18 may actually be incorporated into the play of the game. For example, if the user accumulates enough points, the user may be afforded an opportunity to purchase items, for example at a discount.

Figure 7:
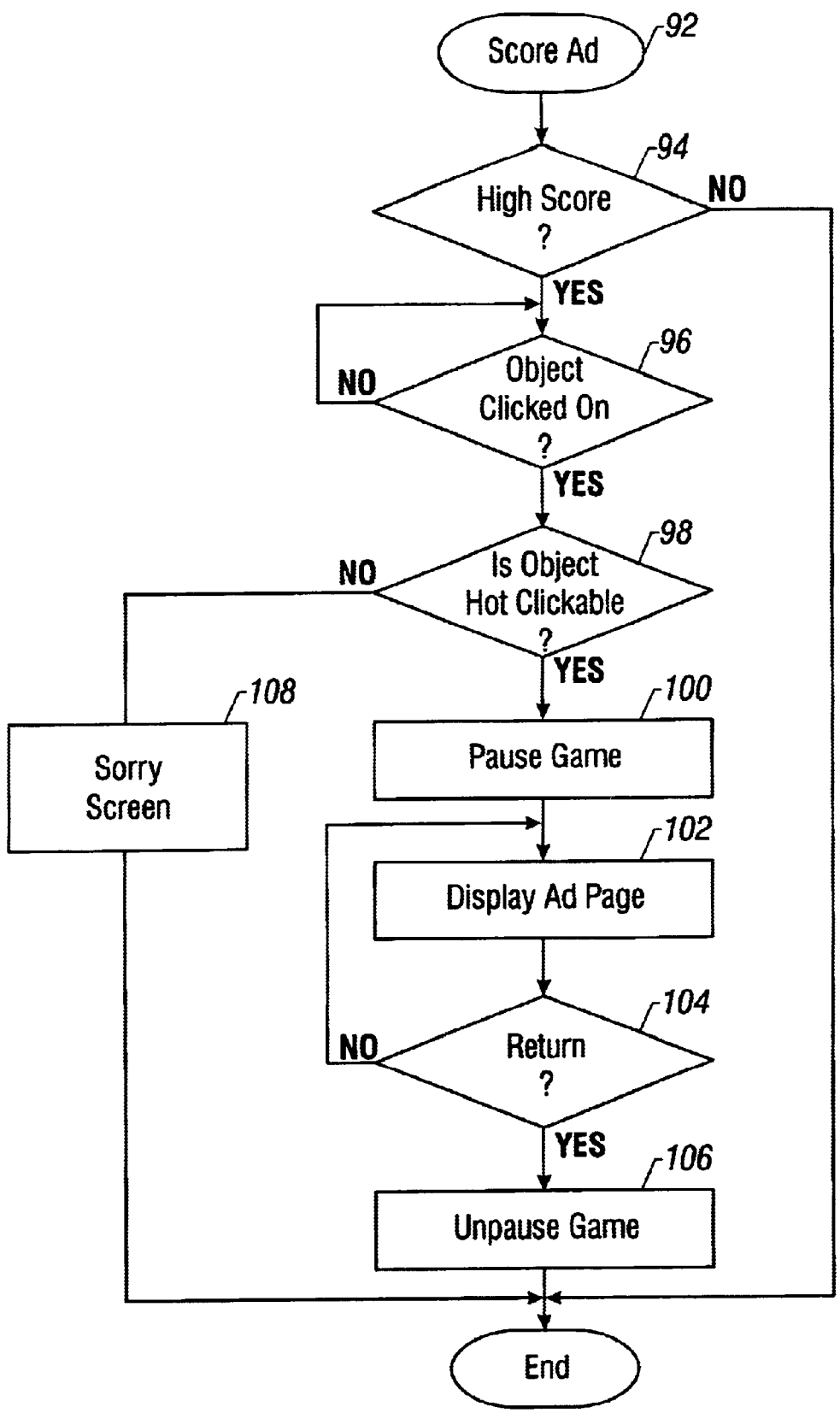
FIG. 7 is a flow chart for software in accordance with still another embodiment of the present invention.

The ad scoring software 92, shown in FIG. 7, begins by determining whether a certain score level has been achieved in the course of a video game as indicated in diamond 94. If so, the software 92 determines whether an object is clicked on by the user in the course of game play as indicated in diamond 96. Once the user has achieved a certain score, the user may be entitled to thereafter click on an image element and to purchase an item, for example at a discount. If the clicked upon object is hot clickable as determined in diamond 98, the game may be paused as indicated in block 100.

Once the game is paused, the advertising may be displayed as before as indicated in block 102. If the user selects the return icon 24 (diamond 104), the game is automatically unpaused as indicated in block 106 and play continues. If the item that the user selected is not hot clickable, the sorry screen is displayed as indicated in block 108.

A wide variety of items may be sold using the hot clickable image elements. For example, clothing and action figures or dolls associated with the image elements may be offered in this fashion.

Figure 8:
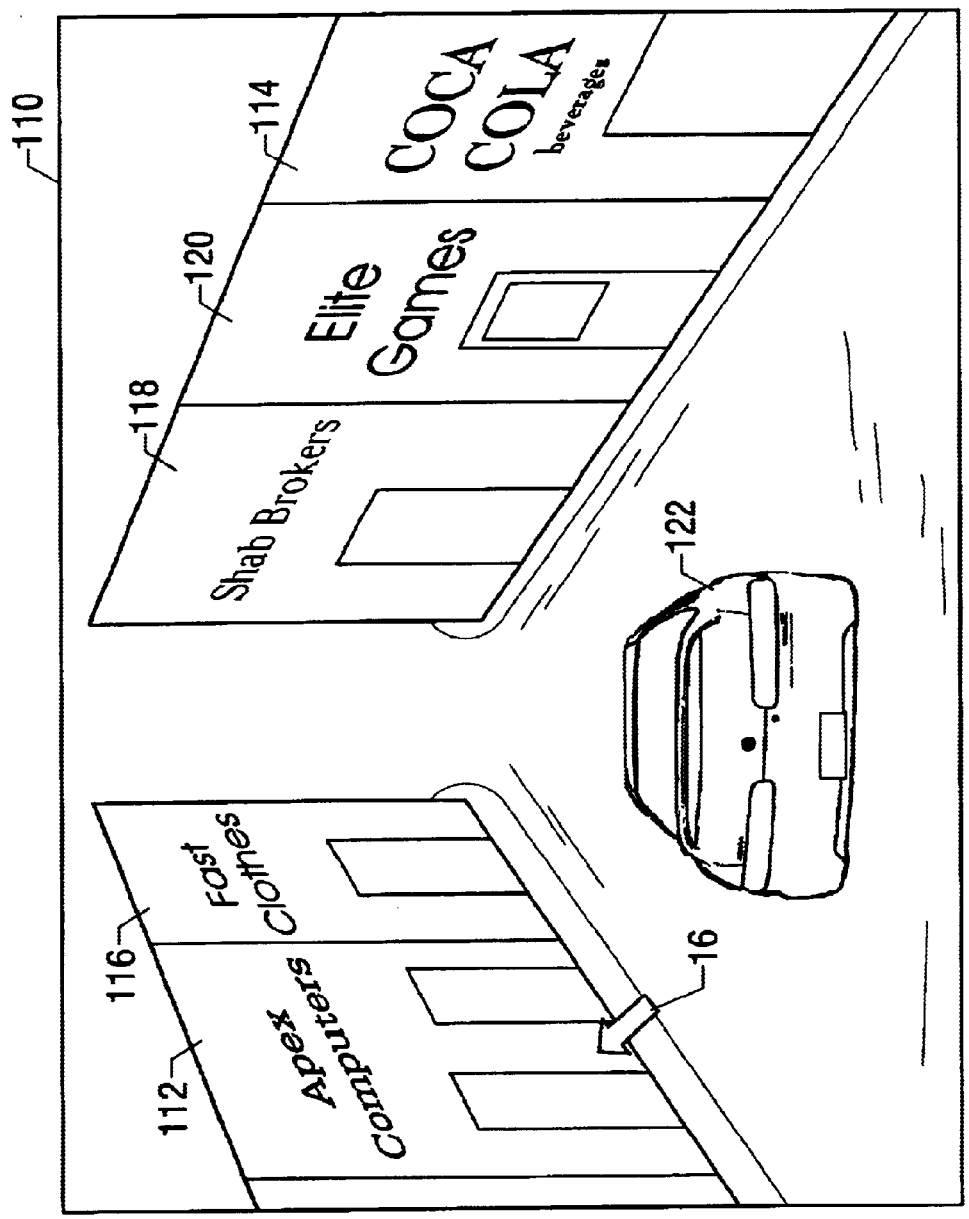
FIG. 8 is a graphical user interface in accordance with another embodiment of the present invention, COCA-COLA is a registered trademark of the Coca-Cola Company.

A background graphical user interface 110, shown in FIG. 8, may display various retail outlet image elements 112–120. The image elements 112–120 may be incidental to the foreground or active image element such as the element 122. The image elements 112–120 may be user selected to purchase items unrelated to the play of the game. For example, a particular store image 112, displayed merely as background, may be a hot clickable image element that may be selected to initiate transactions, for example over the Internet.

In addition, items that are utilized by image elements 14 in the course of the game may be clicked on to initiate a purchase. These items may not otherwise be directly related to the game.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   recognizing a user selection of a video game image element wherein a hot clickable image element is provided as one of the image elements in a video game;
   displaying an advertising in response to the selection of said hot clickable image element;
   automatically pausing the video game in response to said selection; and
   collecting information about the selection of an image element that is not a hot clickable element; to enable incorporation of said image element that is not hot clickable into the video game as an image element that is hot clickable.

2. The method of claim 1 wherein displaying an advertising in response to the selection said hot clickable image element includes replacing a video game graphical user interface with an advertising graphical user interface.

3. The method of claim 2 further including recognizing a user selection of an advertising icon on said advertising graphical user interface, which returns the user to an unpaused video game.

4. The method of claim 1 wherein recognizing the user selection includes recognizing a user mouse click selection when a cursor is over said hot clickable image element.

5. The method of claim 1 including receiving additional advertising for inclusion in the game over the Internet.

6. The method of claim 1 including providing a video game on a recordable storage medium and storing said advertising in said recordable storage medium.

7. The method of claim 1 including storing said video game on a recordable storage medium and providing a link over the Internet to said advertising.

8. The method of claim 1 wherein displaying an advertisement includes displaying said advertising after the play of the video game is completed.

9. The method of claim 1 including affording an opportunity to purchase an article corresponding to said hot clickable image element based on the user's performance in the course of a game.

10. The method of claim 1 including providing a video game including action characters and background material, incorporating hot clickable elements in the background material such that when those elements are mouse clicked on, advertising is automatically displayed.

11. The method of claim 1 wherein displaying an advertising includes displaying a graphical user interface including a representation of the hot clickable image element selected and information about purchasing an item related to said hot clickable element, said graphical user interface including an icon to enable the user to purchase the item and an icon to enable the user to return to the game play.

12. An article comprising a machine-readable storage medium storing instructions that when executed enable a processor-based system to:
    recognize a user selection of a video game image element;
    provide a hot clickable image element as one of the image elements in a video game;
    display advertising in response to selection of said hot clickable image element;
    automatically pause the video game in response to said selection; and
    collect information about the selection of an image element that is not hot clickable to enable incorporation of the image element that is not hot clickable into the video game as an image element that is hot clickable.

13. The article of claim 12 further storing instructions that enable a processor-based system to replace a video game graphical user interface with an advertising graphical user interface.

14. The article of claim 13, further storing instructions that enable a processor-based system to provide a user selectable icon on said advertising interface that when selected returns the user to an unpaused video game.

15. The article of claim 12 further storing instructions that enable the processor-based system to recognize a user mouse click selection when a cursor is over said hot clickable image element.

16. The article of claim 12 further storing instructions that enable the processor-based system to detect the end of play of a video game and to automatically display said advertising in response to the detection of the end of play.

17. The article of claim 12 further storing instructions that enable the processor-based system to afford an opportunity to purchase an article corresponding to said hot clickable image element based on the user's performance in the course of the game.

18. The article of claim 12 further storing instructions that enable the processor-based system to incorporate hot clickable elements into background material in a video game such that when those elements are mouse clicked on, the advertising is automatically displayed.

19. The article of claim 12 further storing instructions that enable the processor-based system to display a graphical user interface including a representation of the hot clickable image element selected and information about purchasing an item related to said hot clickable element, said graphical user interface including an icon to enable the user to purchase the item and an icon to enable the user to return to the game play.

20. The article of claim 12 further storing instructions that enable the processor-based system to obtain additional advertising for inclusion in the game over the Internet.

21. A system comprising:

a processor;

a storage coupled to said processor, said storage storing instructions that enable the processor to implement a video game, recognize a user selection of a video game image element, operate a hot clickable image element as one of the image elements in the video game, display an advertising in response to selection of said hot clickable image element, automatically pause the video game in response to said selection, and collect information regarding the selection of an image element that is not hot clickable, to enable incorporation of the image element that is not hot clickable into the video came as an image element that is hot clickable.

22. The system of claim 21 wherein said storage further stores instructions that enable the processor to recognize a user mouse click selection when a cursor is over said hot clickable image element.

23. The system of claim 21 wherein said system is a computer system including game controls.

24. The system of claim 21 wherein said storage stores instructions that enable the processor to receive additional advertising for inclusion in the game over the Internet.

25. The system of claim 21 further storing instructions that enable a processor to replace a video game graphical user interface with an advertising graphical user interface and return the user to the video game after user selection of an icon on said advertising interface.

26. A method comprising:

providing a graphical user interface that is part of a video game, said graphical user interface including one or more background image elements and one or more action image elements, wherein a hot clickable element is provided as one of said background image elements and one of said action image elements;

identifying a user selection of a hot clickable image element;

automatically pausing said video game in response to the user's selection; and collecting information about the selection of an image element that is not a hot clickable element to enable the incorporation of said image element that is not hot clickable into the video game as an image element that is hot clickable.

\* \* \* \* \*